UNITED STATES PATENT OFFICE.

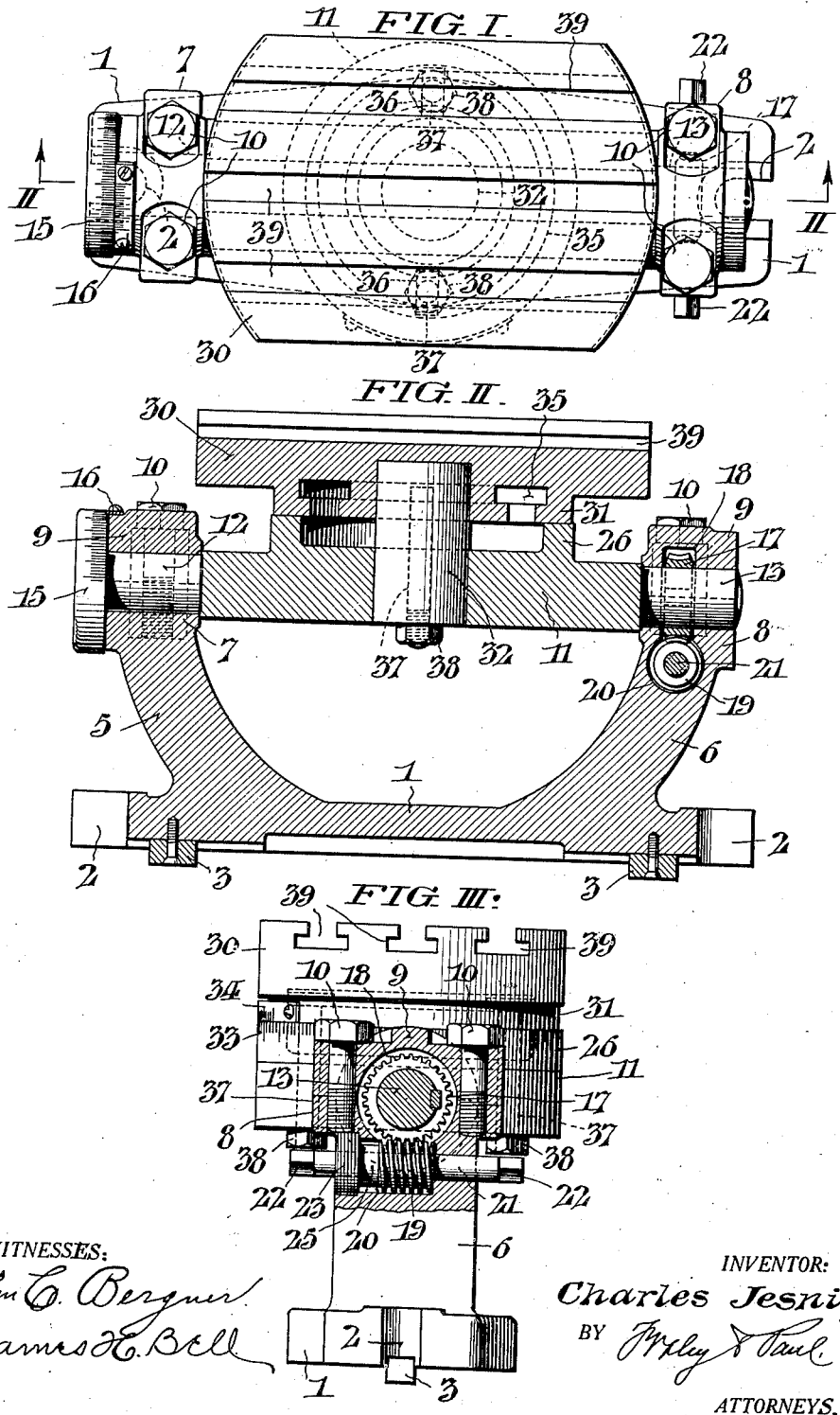

CHARLES JESNIG, OF PHILADELPHIA, PENNSYLVANIA.

UNIVERSAL WORK-HOLDER.

1,341,646.  Specification of Letters Patent.  Patented June 1, 1920.

Application filed March 27, 1919. Serial No. 285,520.

*To all whom it may concern:*

Be it known that I, CHARLES JESNIG, a citizen of the United States, and a resident of Philadelphia, in the county of Philadelphia and State of Pennsylvania, have invented certain new and useful Improvements in Universal Work-Holders, whereof the following is a specification, reference being had to the accompanying drawings.

The invention relates to work holders or jigs having capacity for universal angular adjustability, and such as may be advantageously employed in connection with machine tools or other similar devices.

To this end, the invention consists of a table to which the work is secured, and which through the interposition of compounded pivotal connections is rendered capable of universal adjustment, with respect to its supporting base.

The invention is further directed to novel means for fixing the various angular adjustments of the work supporting table, and also to devices, by the aid of which, such adjustments may be accurately predetermined.

The organization whereby I attain the ends above pointed out, will be best understood from the detailed description which follows.

In the drawings, Figure I, is a plan view of a work holder conveniently embodying my invention.

Fig. II, is a longitudinal sectional elevation of the same as viewed in the direction of the arrows II—II, in Fig. I, and Fig. III, is an elevation of the right hand end of the device, portions thereof being shown in section to more readily set forth certain details.

The organization is supported by an elongated base member or plate 1, whose ends are notched as at 2, 2, to accommodate suitable clamp bolts by which the device may be detachably secured to the table of any machine tool. This base plate is accurately machined at its bottom face and supplemented with blocks 3, 3, adapted to fit the slots or grooves ordinarily formed in the supporting tables of the machine tools, and serve as registering or alining members. Projecting upwardly from the base plate 1, are a pair of integral, complementarily disposed, curved arms 5, 6, in the ends of which are formed the bearings 7, 8, respectively. Each of these bearings is furnished with the usual cap piece 9, preferably secured in this instance, by screw bolts 10.

Between the ends of the arms 5, 6, is supported a bed plate 11, provided with trunnions 12, 13, which are journaled respectively in the bearings 7, 8. The trunnion 12, extends beyond its bearing and is provided with a graduated disk or collar 15, which is associated with a vernier scale 16, fixed adjacent the edge of the bearing, as best shown in Figs. I and II. By this means, the angle through which it is desired to tilt the bed plate about the horizontal axis of its trunnions, may be readily predetermined. This tilting is preferably accomplished through the instrumentality of a worm gear 17, fixed to the trunnion 13, and concealed in a chamber 18, formed in the bearing 8. The gear 17, is rotated by a worm 19, lodged within a suitable opening 20, in the arm 6, and carried by a shaft 21, whose ends protrude laterally to the exterior of their mounting and are squared as at 22, 22, (Fig. III) for engagement with a suitable actuating key. The worm 19, and its shaft 21, are preferably made integral. In order, therefore, to permit assembly, the bore of the cavity 20, in which the worm is lodged is continuous at one side, to the exterior, and closed by a threaded collar 23, which serves as a journal for the shaft at that end. Said collar also serves as a keeper, its inner face engaging an enlargement 25, of the shaft, as best seen in Fig. III. The worm gear couple which I have just described, is not only useful in serving as a means for shifting the bed plate, but is also functional in preventing displacement after the adjustment has been made.

The central portion of the bed plate 11, is circular in contour (see Fig. I), and from its upper surface rises an annular ridge 26, which forms a bearing seat for a turn table 30, upon which the work is supported. This table is supplemented upon its lower face, with an annular boss 31, which is complementary to, and rides upon the ridge 26, of the bed plate 11, while swinging about the swivel connection afforded by a post 32, centrally fixed in said table and projecting downwardly into a receiving aperture in the bed plate. The work supporting table has the configuration of a circle segment whose bounding chords are represented by straight edges equidistant from the center of curvature. The angular positions of the table are determined through coördination of a scale 33, upon the periphery of the annular ridge 26, with a vernier 34, secured to the boss 31. Said boss is provided with an annular shouldered groove 35, within which are retained the quadrangular heads 36, (Figs. I and III) of the screw bolts 37, which pass through the bed plate 11, and are furnished, at their lower ends, with clamp nuts 38, so that by this means, the table 30, is adjustably securable to said bed plate. The heads 36, of the bolts 37, are so proportioned that they may be readily inserted in the narrow portion of the groove 36, and by subsequently turning them through a right angle, may be locked behind the retaining shoulder of the groove. The turn table 30 is shown as provided with under cut grooves 39 in its upper side for the convenient adjustment of the work.

In the practical application of the device, the work supported upon the table 30, may be swung, first, through any desired angle about its own swivel axis, and a second adjustment may be thereafter made by shifting the bed plate 11, about its trunnions through the actuation of the worm gear 19, as hereinbefore noted.

From the foregoing, it will be observed that my invention comprehends a work holder, which, by virtue of its compound adjustment features, is universal in scope, and therefore adapted to support the work in any desired angular relation to the operating tool of the machine to which it is applied.

While I have described my invention as especially useful in connection with machine tools, I do not wish to confine it to this scope alone, since it is obviously applicable to other purposes.

Having thus described my invention, I claim:

1. In a device of the class described, the combination of a supporting base with a pair of arms extending upward therefrom; a bed plate mounted between said arms with capacity for turning about a horizontal axis; a worm gear turning mechanism for said bed plate associated with and interacting between the same and one of said arms, and comprising intermeshing worm and gear elements, one on the arm, and the other on the bed plate; and a work supporting table swivelly attached to the bed plate so as to be capable of turning in a direction at right angles to the pivotal axis of the table.

2. In a device of the class described, the combination of a supporting base; a pair of integral arms extending upwardly from said base; bearings formed in the outer ends of said arms; a bed plate mounted between said arms and provided with trunnions journaled to turn about a horizontal axis in the said bearings; means for turning said plate including a worm gear secured to one of said trunnions and concealed within a cavity in the corresponding bearing; a coöperative worm similarly concealed, and provided with protruding shaft projections having squared ends for key actuation; and a work supporting table swivelly attached to the bed plate and capable of being turned in a direction at right angles relative to the pivotal axis of the latter.

3. In a device of the class described, the combination of a supporting base with a pair of arms extending upward therefrom; a bed plate mounted between said arms and having trunnions journaled therein to turn about a horizontal axis; a turning mechanism associated with one of said arms and trunnions and comprising a worm gear in the trunnion and a worm mounted on the arm; and a work supporting table swivelly attached to the bed plate so as to be capable of turning in a direction at right angles to the pivotal axis of the table.

In testimony whereof I have hereunto signed my name at Philadelphia, Pennsylvania, this 24th day of March, 1919.

CHARLES JESNIG.

Witnesses:
JAMES H. BELL,
E. L. FULLERTON.